United States Patent
Niu et al.

(10) Patent No.: US 8,619,612 B2
(45) Date of Patent: Dec. 31, 2013

(54) MEASUREMENT AND FEEDBACK CALCULATION FOR WIRELESS COMMUNICATION NETWORK

(75) Inventors: Huaning Niu, Milpitas, CA (US); Yi Hsuan, Sunnyvale, CA (US); Ayelet Doron, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 13/099,059

(22) Filed: May 2, 2011

(65) Prior Publication Data

US 2012/0281552 A1 Nov. 8, 2012

(51) Int. Cl.
*H04W 24/00* (2009.01)

(52) U.S. Cl.
USPC ........ 370/252; 370/328; 370/342; 455/67.13; 455/69; 455/452.2

(58) Field of Classification Search
None
See application file for complete search history.

(56) References Cited

U.S. PATENT DOCUMENTS

| | | | | |
|---|---|---|---|---|
| 8,331,871 B2 * | 12/2012 | Roh et al. | ................... | 455/67.13 |
| 2008/0219376 A1 * | 9/2008 | Qi et al. | ....................... | 375/285 |
| 2009/0017769 A1 | 1/2009 | Chen et al. | ....................... | 455/69 |
| 2011/0069773 A1 | 3/2011 | Doron et al. | .................. | 375/267 |
| 2011/0085495 A1 * | 4/2011 | Ko et al. | ....................... | 370/328 |
| 2012/0069927 A1 * | 3/2012 | Oyman et al. | ................ | 375/285 |
| 2013/0021980 A1 * | 1/2013 | Yang et al. | .................... | 370/328 |

FOREIGN PATENT DOCUMENTS

| | | |
|---|---|---|
| KR | 10-2008-0095734 A | 10/2008 |
| WO | 2010/064695 A1 | 6/2010 |
| WO | 2012/151023 A2 | 11/2012 |
| WO | 2012/151023 A3 | 3/2013 |

OTHER PUBLICATIONS

International Search Report and Written opinion received for PCT patent Application No. PCT/US2012/031992, mailed on Jan. 14, 2013, 9 pages.

* cited by examiner

*Primary Examiner* — Chi Pham
*Assistant Examiner* — Shick Hom
(74) *Attorney, Agent, or Firm* — Cool Patent, P.C.; Kenneth J. Cool; Joseph P. Curtin

(57) ABSTRACT

A method for performing measurement by a radio apparatus is presented. In one embodiment, the method includes determining raw measurements (e.g., a channel estimation and a noise variance estimation) of a subband and determining a rank indicator (RI) without requiring a precoding matrix indicator (PMI) search. The method includes calculating, based at least on the raw measurements, a mean instantaneous capacity (MIC) for the subband and determining a channel quality indicator (CQI) and a PMI based at least on the MIC. In one embodiment, the method uses subband-based measurements for performing feedback/measurement.

20 Claims, 7 Drawing Sheets

MEASUREMENT AND FEEDBACK CALCULATION FOR WIRELESS COMMUNICATION NETWORK

FIELD OF THE INVENTION

Embodiments of the invention relate to data communications; more particularly, embodiments of the invention relate to determining channel state information.

BACKGROUND OF THE INVENTION

It is becoming increasingly common to find broadband wireless networking capabilities (e.g., IEEE 802.11, 802.16e, LTE, etc.) in mobile devices. In many network environments, a network device establishes communication with an access point, e.g., a base station of a cellular network, for both uplink and downlink access. OFDMA-based wireless broadband technologies include 3GPP LTE and 3GPP UMB. Mobile WiMAX, for example, uses a scalable orthogonal frequency division multiple access (OFDMA) scheme to deliver wireless broadband packet data services to mobile terminals.

LTE specifications define indicators that reflect the channel state information (CSI) as observed by the receiver of the communication, for example, user equipment, UE. The main indicators include the channel quality indicator (CQI), the rank indication (RI), and the precoding matrix indicator (PMI). The reporting of these indicators is performed either periodically or aperiodically in conjunction with physical uplink control channel (PUCCH) or physical uplink shared channel (PUSCH). Additionally, for multiple-input-multiple-output (MIMO) operation, the selection of either closed-loop or open-loop mode depends on the rate of change in the channel conditions.

In general, the feedback is measured using cell specific reference signal (CRS) which is referred to herein as reference signal (RS). For the first and the second antenna ports, there are eight reference signals per resource block (RB), for the third and fourth antenna ports, there are four reference signals per resource block. Typically, the CQI and PMI are calculated using mean instantaneous capacity (MIC) over the entire RS and thus incur large computation overhead. For example, a wideband CQI calculation over 20 MHz channel may require 16×100 logarithmic operations.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
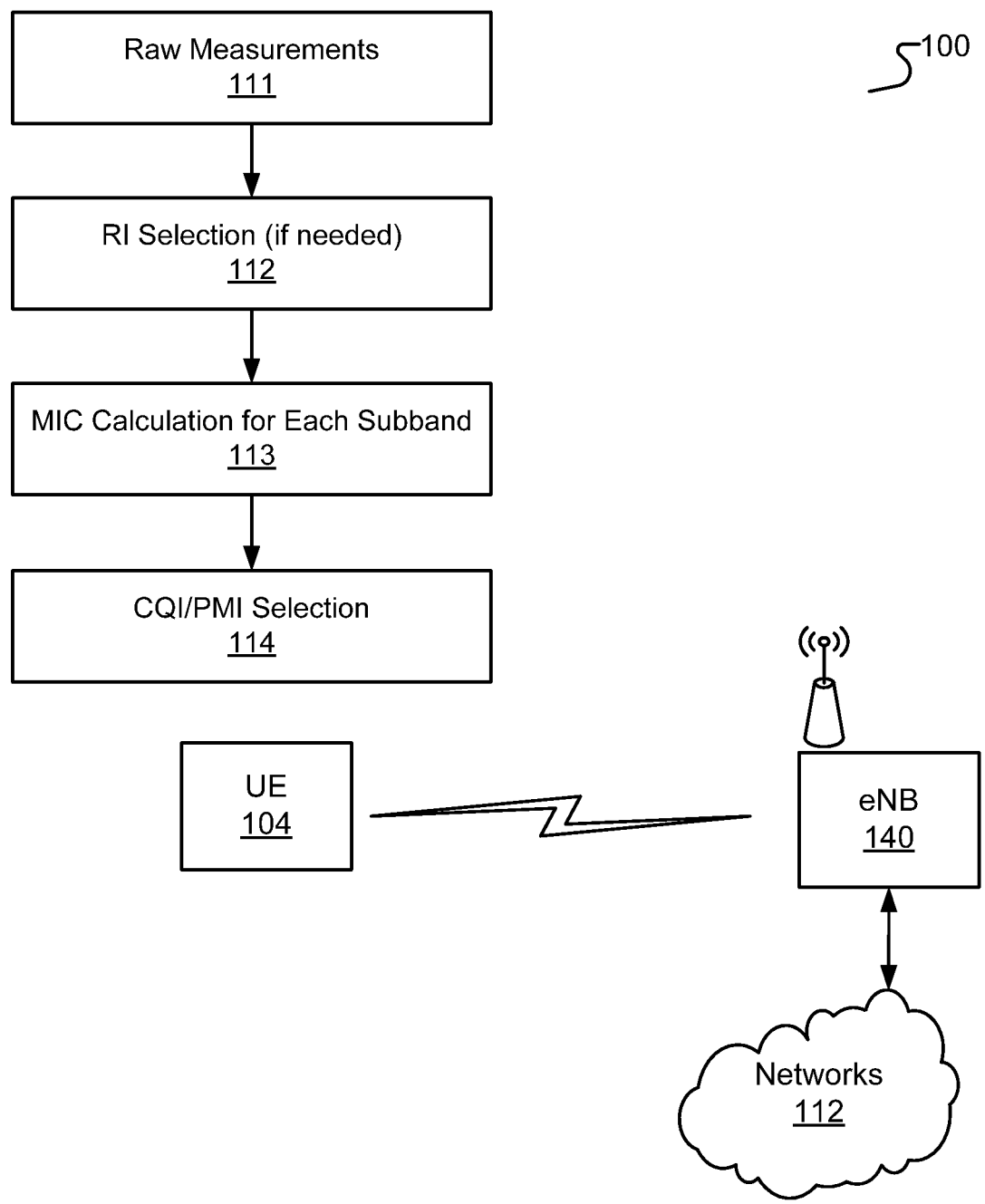
FIG. 1 is a flow diagram of one embodiment of a process to determine measurement.

A method for performing measurement by a radio apparatus is presented. In one embodiment, the method includes determining raw measurements (e.g., a channel estimation and a noise variance estimation) of a subband and determining a rank indicator (RI) without requiring a precoding matrix indicator (PMI) search. The method includes calculating, based at least on the raw measurements, a mean instantaneous capacity (MIC) for the subband and determining a channel quality indicator (CQI) and a PMI based at least on the MIC. In one embodiment, the method uses subband-based measurements for performing feedback/measurement.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

The method and apparatus described herein are for performing measurements for radio transmissions. Specifically, performing measurements for radio transmissions is primarily discussed in reference to mobile devices. The method and apparatus for performing measurements for radio transmissions, however, are not so limited, as they may be implemented on or in association with any integrated circuit device or system, such as cell phones, personal digital assistants, embedded controllers, mobile platforms, desktop platforms, and server platforms, as well as in conjunction with other resources.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), hybrid coordinators (HCs), gateways, bridges, hubs, routers, relay stations, repeaters, analog repeaters, and amplify and forward repeaters. Further, the radio systems within the scope of the invention may include cellular radio telephone systems, satellite systems, personal communication systems (PCS), two-way radio systems, and two-way pagers as well as computing devices including radio systems such as personal computers (PCs) and related peripherals, personal digital assistants (PDAs), personal computing accessories, and all existing and future arising systems which may be related in nature and to which the principles of the inventive embodiments could be suitably applied.

While the following detailed description may describe example embodiments of the present invention in relation to wireless metropolitan area networks (WMANs) or other wireless wide area networks (WWANs), the embodiments are not limited thereto and can be applied to other types of wireless networks in which similar advantages may be obtained. Such networks for which inventive embodiments may be applicable specifically include, wireless personal area networks (WPANs), wireless local area networks (WLANs), WWANs such as cellular networks, or combinations of any of these networks. Further, inventive embodiments may be discussed in reference to wireless networks utilizing Orthogonal Frequency Division Multiplexing (OFDM) modulation. The embodiments of present invention, however, are not limited thereto and, for example, the embodiments can be implemented using other modulation or coding schemes where suitably applicable.

Overview

In one embodiment, methods and apparatuses to perform measurements and feedback for data transmission in conjunction with the LTE release 9 are presented. In one embodiment, measurements, including a channel quality indicator (CQI), a precoding matrix indicator (PMI), a rank indicator (RI), and the subband selection, are fed back to a base station (or eNB) via physical uplink control channel (PUCCH) for periodic reporting or physical uplink shared channel (PUSCH) for the aperiodic reporting.

In one embodiment, different reporting modes based on CQI and PMI types are summarized in the following Table 1. The corresponding transmission modes are listed in Table 2.

TABLE 1

CQI and PMI Report Modes

|  | No PMI | Single PMI | Multiple PMI |
|---|---|---|---|
| Wideband (wideband CQI) | Mode 1-0 Report channel: PUCCH Transmission mode: 1, 2, 3, 7, 8 | Mode 1-1 Report channel: PUCCH Transmission mode: 4, 5, 6, 8 | Mode 1-2 Report channel: PUSCH Transmission mode: 4, 6, 8 |
| UE Selected (subband CQI) | Mode 2-0 Report channel: PUSCH/PUCCH Transmission mode: 1, 2, 3, 7, 8 | Mode 2-1 Report channel: PUCCH Transmission mode: 4, 5, 6, 8 | Mode 2-2 Report channel: PUSCH Transmission mode: 4, 6, 8 |
| Higher layer-configured (subband CQI) | Mode 3-0 Report channel: PUSCH Transmission mode: 1, 2, 3, 7, 8 | Mode 3-1 Report channel: PUSCH Transmission mode: 4, 5, 6, 8 |  |

TABLE 2

List of MIMO modes

| Transmission Mode | Transmission scheme of PDSCH corresponding to PDCCH |
|---|---|
| Mode 1 | Single antenna port, port 0 |
| Mode 2 | Transmit diversity |
| Mode 3 | Large delay CDD or Transmit diversity |
| Mode 4 | Close loop spatial multiplexing |
| Mode 5 | Multi-user MIMO |
| Mode 6 | Close loop spatial multiplexing using a single transmission layer |
| Mode 7 | Single antenna port, port 5 |
| Mode 8 | Dual layer transmission: port 7 and 8 or single-antenna port: port 7 or 8 |

In one embodiment, the combination of eight feedback modes in conjunction with eight transmission modes yields a total of 33 different combinations of transmission and feedback modes. In one embodiment, an efficient and unified architecture is used to support all measurements including, but not limited to, the wideband/subband/best-M CQI, the wideband/subband/best-M PMI, and the RI.

FIG. 1 is a flow diagram of one embodiment of a process to determine measurement. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., UE 104, eNB 140). In one embodiment, the process is performed by a computer system, such as the computer system shown in FIG. 7.

Referring to FIG. 1, in one embodiment, processing logic begins by performing raw measurements (process block 111). In one embodiment, for example, there are a total of 25 raw measurement inputs for a 20 MHz channel. The raw measurements include a channel estimate and a noise variance estimate per subband. In one embodiment, processing logic employs a subband down-sample approach to reduce the complexity without sacrificing too much performance loss.

In one embodiment, a subband is a localized frequency resource unit for which a separate CQI is reported. In one embodiment, a subband is a group of adjacent resource blocks.

In one embodiment, processing logic determines a rank indicator (RI) (process block 112). In one embodiment, the RI selection is performed without requiring a PMI search. In one embodiment, a unified RI selection is applied in both closed-loop and open-loop transmission modes. The RI selection is independent from different feedback modes and does not rely on a PMI search. In one embodiment, the RI selection reduces the computational complexity, but yields similar performance as compared to the optimal RI selection algorithm. The RI selection will be described in further detail below with additional references to the remaining figures.

In one embodiment, processing logic calculates a mean instantaneous capacity (MIC) for each subband based at least on the raw measurements (process block 113).

In one embodiment, processing logic determines a channel quality indicator (CQI) and a PMI based at least on the MIC calculations (process block 114). CQI and PMI will be described in further detail below with additional references to the remaining figures.

In one embodiment, all calculations for a wideband CQI, a subband CQI, a wideband PMI, and a subband PMI are based on subband processing. The calculations are performed based on subband-based measurements rather than over the entire reference signal. In one embodiment, the CQI calculation yields similar performance to the optimal CQI estimation. In one embodiment, the PMI and the subband selection process obtain near optimal performance with reduced computation complexity.

Communication Systems

In one embodiment, antennas comprise one or more directional or omnidirectional antennas including for example, dipole antennas, monopole antennas, patch antennas, loop antennas, microstrip antennas, or other types of antennas suitable for transmission of RF signals. In one embodiment, a base station and a mobile station use two or more antennas each. In one embodiment, instead of the two or more antennas, a single antenna with multiple apertures is used.

In one embodiment, UEs (e.g., UE 140) performs similar operations as subscriber stations/mobile stations in accordance with radio access technologies. In one embodiment, UEs include any combination of stationary devices, mobile devices, and portable wireless communication devices, such as, for example, personal digital assistants (PDAs), laptops or portable computers with wireless communication capability, web tablets, wireless telephones, wireless headsets, pagers, instant messaging devices, digital cameras, televisions, medical devices (e.g., a heart-rate monitor, a blood-pressure monitor, etc.), or other devices that communicate information wirelessly.

In one embodiment, a network apparatus comprises wireless devices that comply with or operate in accordance with one or more protocols, such as, for example, WiFi, Bluetooth, UWB, WiMAX, and cellular protocols. Network apparatus (e.g., UE 104, eNB 140) comprises, but is not necessarily limited to, a computer, server, workstation, laptop, ultra-laptop, handheld computer, telephone, cellular telephone, personal digital assistant (PDA), router, switch, bridge, hub, gateway, wireless device, multi-network, multiple integrated radio devices, mixed-network device supporting multiple concurrent radios, WiFi plus cellular telephone, portable digital music player, pager, two-way pager, mobile subscriber station, printer, camera, enhanced video and voice device, and any other one-way or two-way device capable of communicating with other devices or base stations. The embodiments are not limited in this context.

Figure 2:
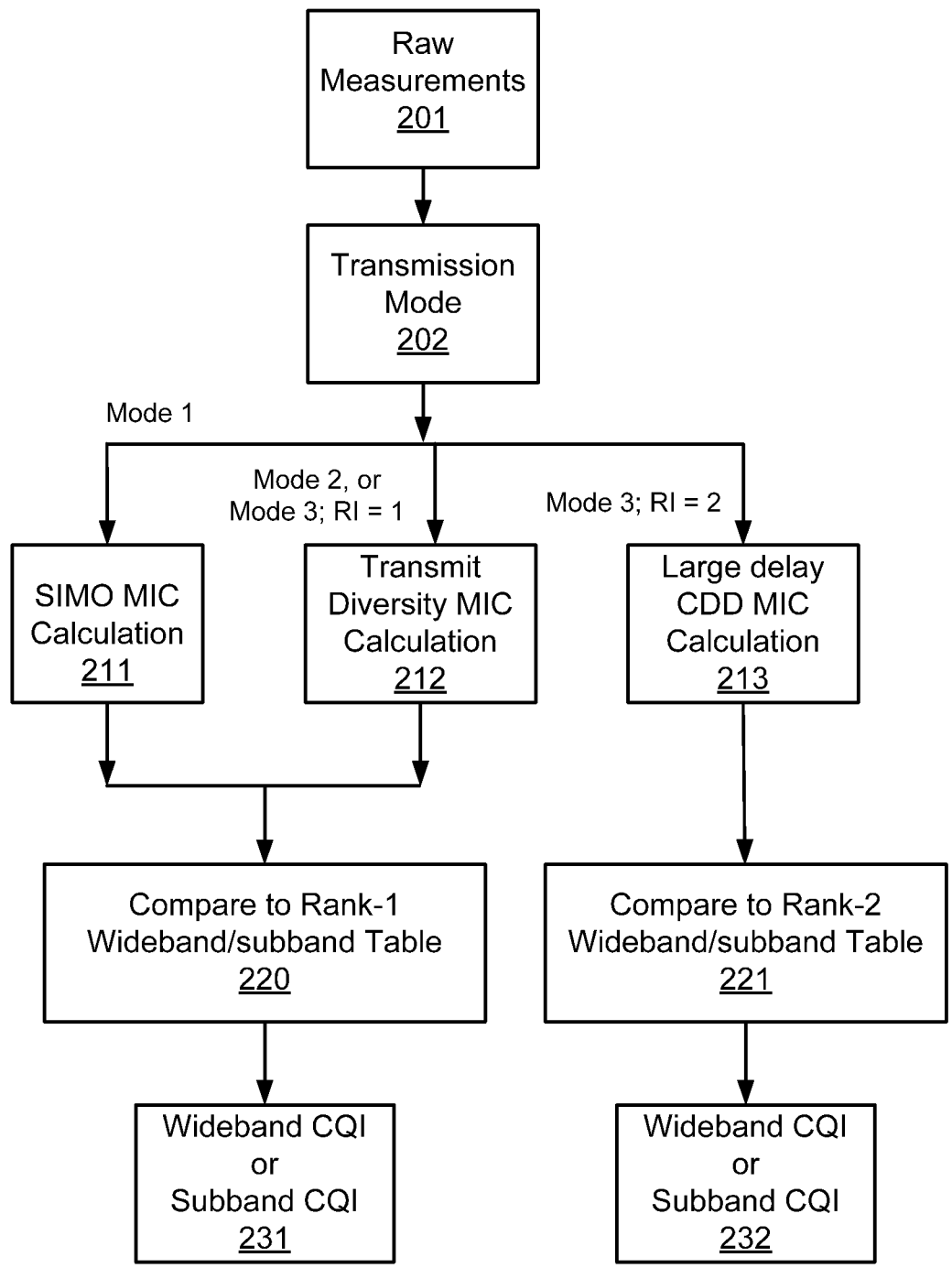
FIG. 2 is a flow diagram of one embodiment of a process to perform a CQI calculation.

FIG. 2 is a flow diagram of one embodiment of a process to perform a CQI calculation (a wideband CQI and a subband CQI). The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., UE 104, eNB 140 with reference to FIG. 1). In one embodiment, the process is performed by a computer system, such as the computer system shown in FIG. 7.

Referring to FIG. 2, in one embodiment, processing logic begins by receiving raw measurements (process block 201). Processing logic identifies the transmission mode in use (process block 202).

In one embodiment, processing logic selects an equation to calculate MICs based on the transmission mode (process blocks 211-213).

In one embodiment, for spatial multiplexing transmission including rank-1 transmission and equal CQI per codeword transmission (e.g., large-delay CDD (cyclic delay diversity)), the MIC is calculated as:

$$MIC = \frac{1}{\text{size}(U_{SB})} \sum_{g \in U_{SB}} \log_2\left(\det\left(I + F_l^H H_g^{SB^H} R_g^{SB^{-1}} H_g^{SB} F_l\right)\right) \cdot H_g^{SB}$$

is the raw measurement per subband. $F_l$ is the $l_{th}$ precoder out of the codebook. $F_l$ is "1" for SIMO transmission. $R_g^{SB^{-1}}$ is the inverse of $R_g^{SB}$ matrix which is the noise covariance matrix of the $g^{th}$ subband. $U_{SB}$ is the total number of the subbands.

In one embodiment, for the transmit diversity transmission, the MIC is calculated as:

$$MIC = \frac{1}{\text{size}(U_{SB})} \sum_{g \in U_{SB}} \frac{1}{N_F} \sum_{l=1}^{N_F} \log_2\left(1 + tr\left(F_l^H H_g^{SB^H} R_g^{SB^{-1}} H_g^{SB} F_l\right)\right).$$

$N_F$ is the number of precoders defined in the codebook. $tr(\ )$ is a trace operation.

In one embodiment, for closed-loop rank-2 transmission in which the MICs for two codewords can be different, a MIC is calculated as:

$$SINR_{post}(g) = 1./\text{diag}[(I + F^H H_g^{SB^H} R_g^{SB^{-1}} H_g^{SB} F)^{-1}] - [1, 1]$$

$$MIC(v) = \frac{1}{\text{size}(U_{SB})} \sum_{g \in U_{SB}} \log_2(1 + SINR_{post}(g, v))$$

Figure 3:
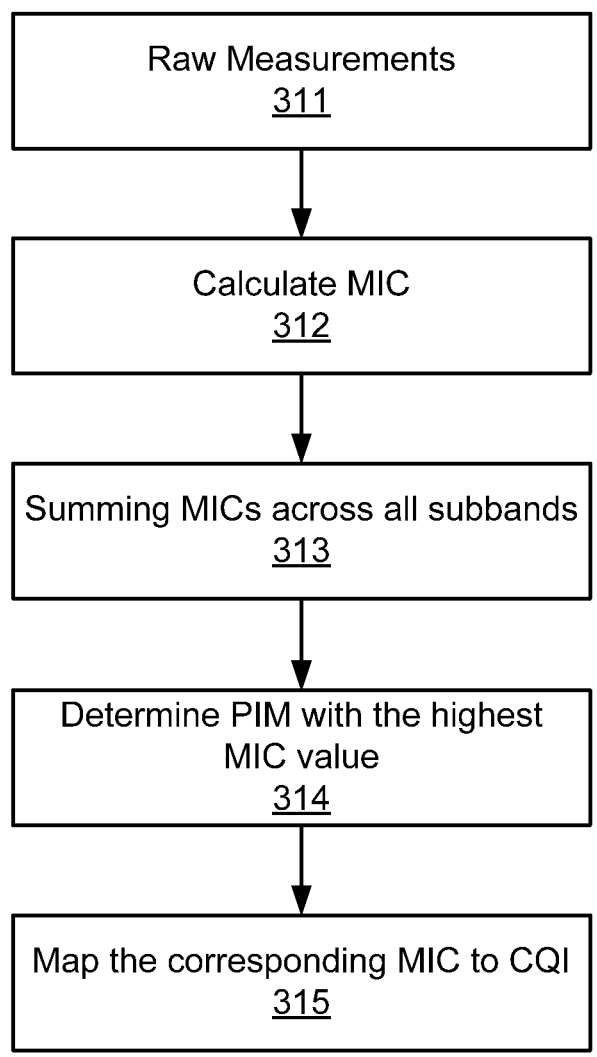
FIG. 3 is a flow diagram of one embodiment of a process to perform a single PMI calculation.

FIG. 3 is a flow diagram of one embodiment of a process to perform a single PMI calculation. (for example, a single wideband PMI). The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., UE 104, eNB 140 with reference to FIG. 1). In one embodiment, the process is performed by a computer system, such as the computer system shown in FIG. 7.

Referring to FIG. 3, in one embodiment, processing logic begins by receiving raw measurements (process block 311).

In one embodiment, processing logic calculates the MIC for every subband per codeword (process block 312). Processing logic calculates the sum of MICs across all relevant subbands (process block 313).

In one embodiment, processing logic determines the PMI which yields the highest MIC (process block 314). Processing logic maps the corresponding MIC to the CQI (process block 315).

Figure 4:
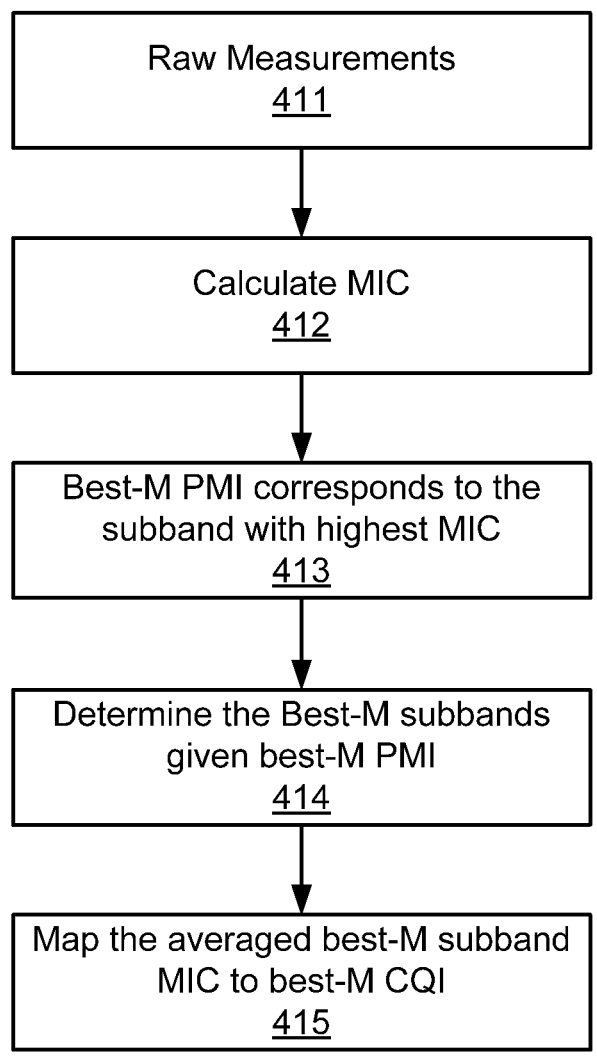
FIG. 4 is a flow diagram of one embodiment of a process to perform best-M PMI and subband selection calculations.

FIG. 4 is a flow diagram of one embodiment of a process to perform best-M PMI and subband selection calculations. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., UE 104, eNB 140 with reference to FIG. 1). In one embodiment, the process is performed by a computer system, such as the computer system shown in FIG. 7.

Referring to FIG. 4, in one embodiment, processing logic begins by receiving raw measurements (process block 411). Processing logic calculates the MIC for every subband per codeword (process block 412).

In one embodiment, processing logic determines the highest subband MIC (process block 413). The PMI corresponding to the highest MIC is the best-M PMI. In one embodiment, only one PMI is regarded as the best-M PMI. For example, instead of trying to find the best-M subbands for each codeword (e.g., 16 codewords if four Tx antennas), processing logic performs a best-M subband selection for one codeword only.

In one embodiment, processing logic determines a number of best-M subbands based on the best-M PMI (process block 414). Processing logic maps the best-M subbands to the best-M CQI (process block 415). In one embodiment, processing logic reduces/limits the CQI determinations to subbands associated with the best-M PMI which is selected based on the highest subband MIC.

Figure 5:
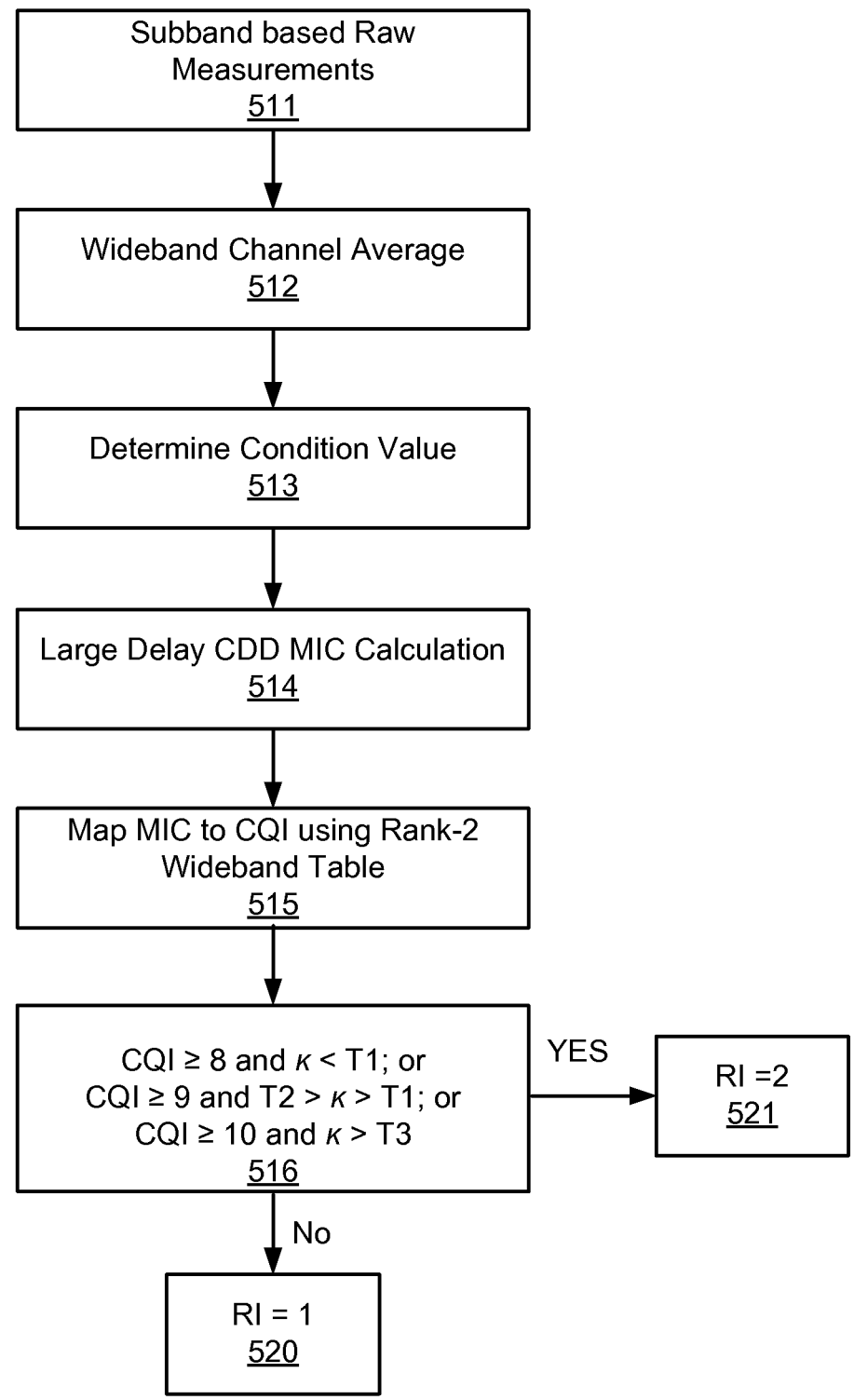
FIG. 5 is a flow diagram of one embodiment of a process to determine a RI selection.

FIG. 5 is a flow diagram of one embodiment of a process to determine a RI selection. The process is performed by processing logic that may comprise hardware (circuitry, dedicated logic, etc.), software (such as one that is run on a general-purpose computer system or a dedicated machine), or a combination of both. In one embodiment, the process is performed in conjunction with a network apparatus (e.g., UE 104, eNB 140 with reference to FIG. 1). In one embodiment, the process is performed by a computer system, such as the computer system shown in FIG. 7.

In one embodiment, the RI is used in transmission modes 3, 4 and 8. The RI indicates the number of streams used during transmission. RI is measured over the entire bandwidth and is often updated in a longer period when compared to the update intervals of the CQI and the PMI. In one embodiment, processing logic separates the RI selection from the PMI search in order to reduce the PMI search space.

In one embodiment, processing logic performs a unified design for both open-loop and closed-loop RI selection. T1,
T2, and T3 are threshold values, which are slightly different depending on whether it is an open-loop or a closed-loop RI selection.

Referring to FIG. 5, in one embodiment, processing logic begins by receiving raw measurements (process block 511). Processing logic calculates the wideband channel average based on $\tilde{H}=E[H_{i,j}^{H}H_{i,j}]$ (process block 512).

In one embodiment, processing logic determines the condition value based on $\kappa=\lambda_1/\lambda_2$ (process block 513). Processing logic performs large delay CDD MIC calculations (process block 514).

Figure 6:
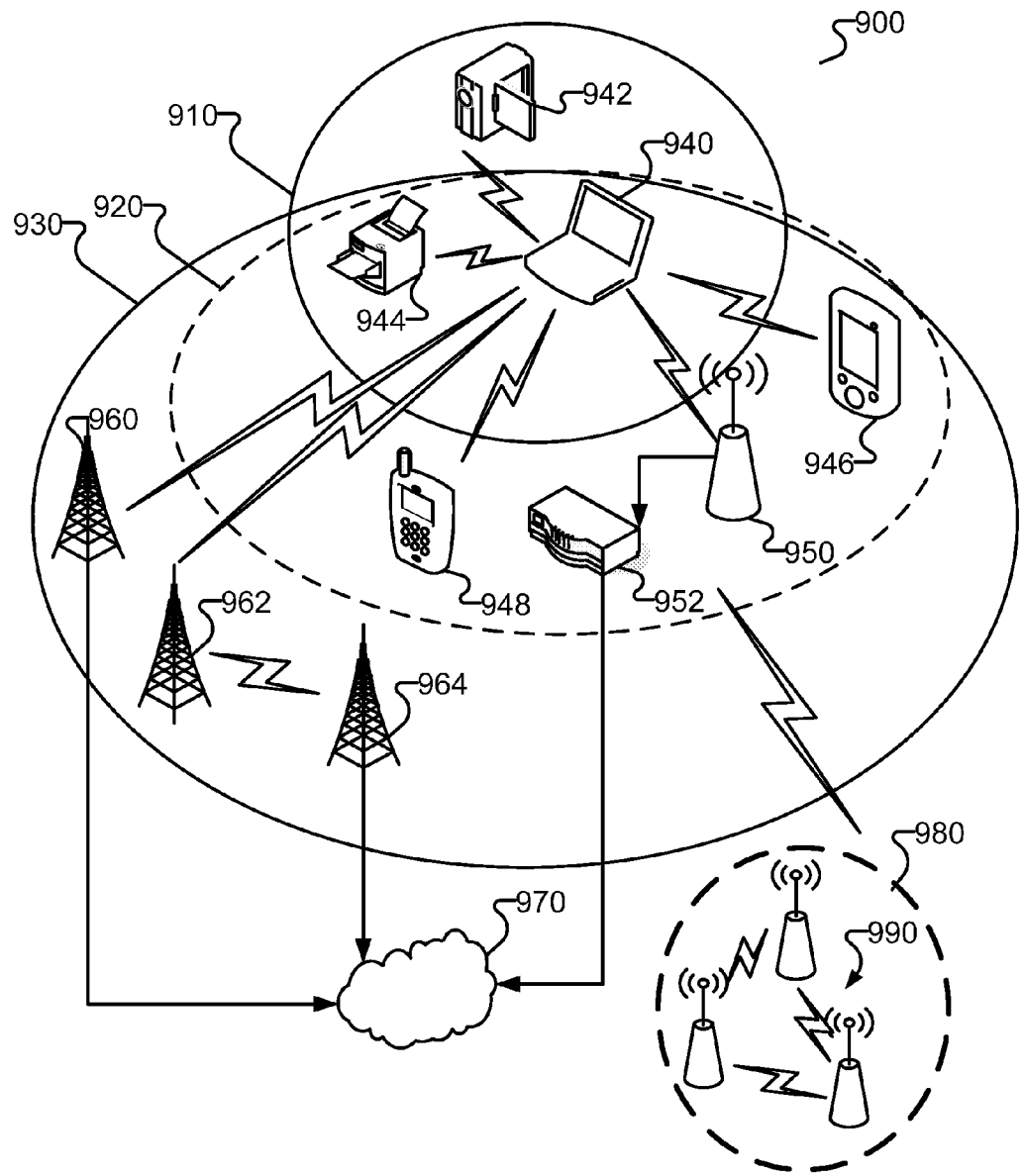
FIG. 6 is a diagram representation of a wireless communication system in accordance with one embodiment of the invention.

In one embodiment, processing logic maps the MIC to the CQI in conjunction with a rank-2 wideband table. Processing logic determines the CQI based on the MIC by reference to a rank-2 wideband table. In one embodiment, processing logic sets the RI=2 if the following conditions are fulfilled. Otherwise, RI is set to 1. The conditions are:

$CQI \geq 8$ and $\kappa < T1$; or $CQI \geq 9$ and $T2 > \kappa > T1$; or $CQI \geq 10$ and $\kappa > T3$ FIG. 6 is a diagram representation of a wireless communication system in accordance with one embodiment of the invention. Referring to FIG. 6, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart-rate monitor, a blood-pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread-spectrum modulation (e.g., direct-sequence code division multiple access (DS-CDMA), frequency-hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct-sequence spread spectrum (DSSS) modulation, frequency-hopping spread spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920, as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 6 depicts a WPAN, a WLAN, and a WMAN, In one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high-performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 7:
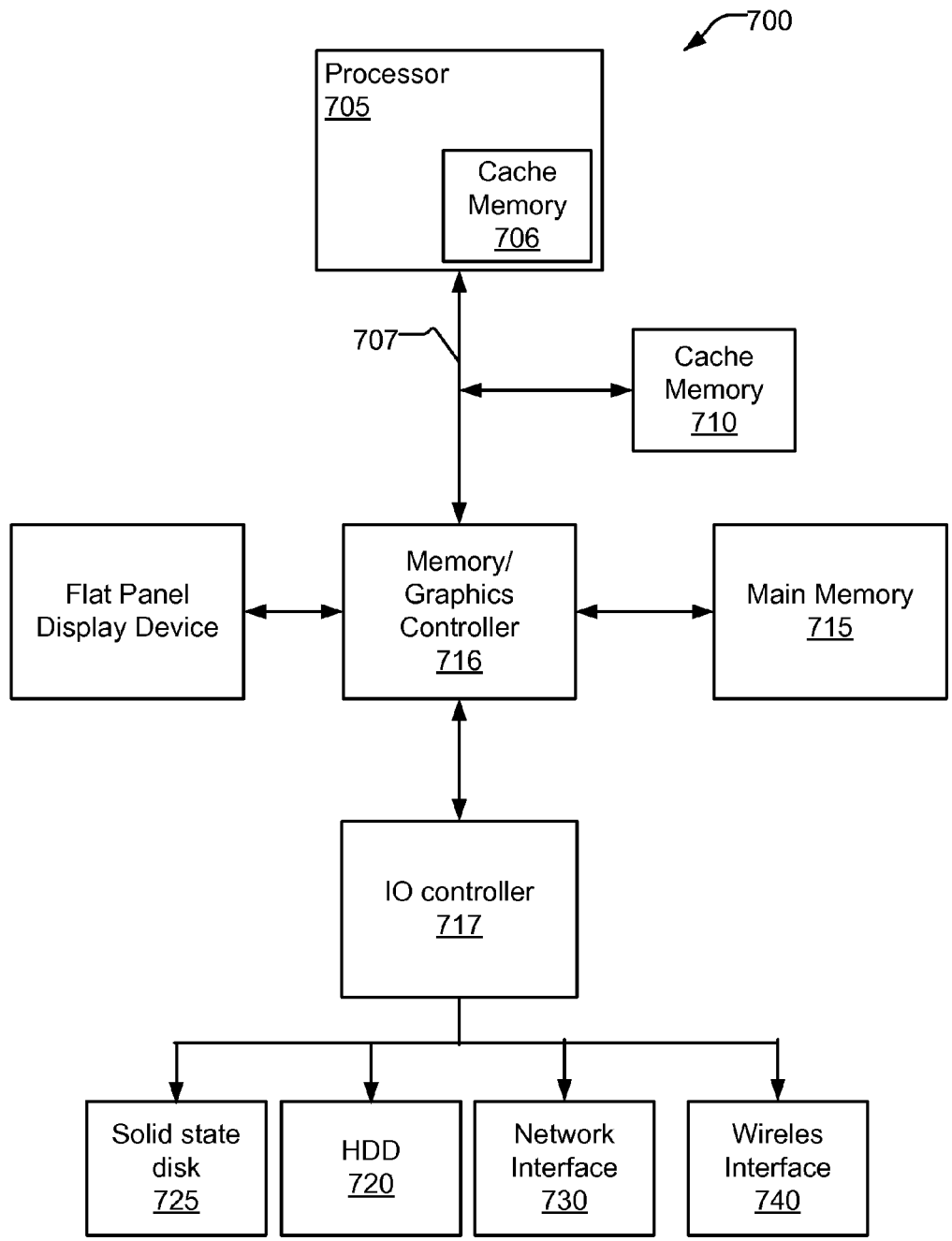
FIG. 7 illustrates a computer system for use with one embodiment of the present invention.

FIG. 7 illustrates an example of a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid-state disk 725 based on NVRAM technology, or a memory source located remotely from the computer system via network interface 730 or via wireless interface 740 containing various storage devices and technologies. In one embodiment, wireless interface 740 supports communication in accordance with LTE, WiMAX, Wireless LAN, or combinations thereof. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 7. Furthermore, in other embodiments of the invention may be distributed throughout several circuits, logic units, or devices illustrated in FIG. 7.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for performing measurement in a wireless communication network, the method comprising:
   determining, by a network device, a first plurality of measurements including a channel estimation and a noise variance estimation of a first subband;
   determining a rank indicator (RI) without requiring a precoding matrix indicator (PMI) search;
   calculating, based at least on the first plurality of measurement, a mean instantaneous capacity (MIC) for the first subband; and
   determining a channel quality indicator (CQI) and a PMI based at least on the MIC.

2. The method of claim 1, wherein the determining the RI is performed independent from feedback modes, wherein the first plurality of measurements include channel estimations and noise variance estimations of subbands including the first subband.

3. The method of claim 1, wherein the first plurality of measurements are subband-based measurements rather than over entire reference signal, further comprising determining a wideband CQI based on the subband-based measurements.

4. The method of claim 1, further comprising determining a wideband CQI, a subband CQI, a wideband PMI, and a subband PMI by using subband-based measurements.

5. The method of claim 1, further comprising determining, based on a transmission mode, the MIC in conjunction with one of MIC calculations that include a Single Input Multiple Output (SIMO) MIC calculation, a transmit diversity MIC calculation, and a large delay CDD (cyclic delay diversity) MIC calculation.

6. The method of claim 1, further comprising determining the PMI which yields the highest total MIC values from subbands in accordance with a single PMI calculation mode.

7. The method of claim 1, further comprising:
   determining the best-M PMI based on the highest subband MIC;
   determining the best-M subbands based on the best-M PMI; and
   mapping the best-NI subbands with the best-NI CQI.

8. The method of claim 1, further comprising:
   calculating the MIC based on a large delay CDD MIC calculation;
   determining the CQI based on the MIC in conjunction with a rank-1 or a rank-2 wideband table; and
   determining the RI based at least on the CQI and eigen values two matrices.

9. The method of claim 1, further comprising calculating the MIC based on $$MIC = \frac{1}{\text{size}(U_{SB})} \sum_{g \in U_{SB}} \log_2\left(\det\left(I + F_l^H H_g^{SB^H} R_g^{SB-1} H_g^{SB} F_l\right)\right)$$

in conjunction with special multiplexing transmission which includes rank-1 transmission.

10. The method of claim 1, further comprising calculating the MIC based on $$MIC = \frac{1}{\text{size}(U_{SB})} \sum_{g \in U_{SB}} \frac{1}{N_F} \sum_{l=1}^{N_F} \log_2\left(1 + tr\left(F_l^H H_g^{SB^H} R_g^{SB-1} H_g^{SB} F_l\right)\right)$$

in conjunction with the transmit diversity transmission.

11. A network system comprising:
   a processor;
   a memory coupled to the processor; and
   a communication device coupled to the processor to communicate wirelessly over multiple sub-channels in an orthogonal frequency division multiple access (OFDMA) wireless network, wherein the communication device is operable to
   perform raw measurements of a first subband;
   select a rank indicator (RI) independent from feedback modes and without requiring a precoding matrix indicator (PMI) search;

calculate, based at least on the raw measurements, a mean instantaneous capacity (MIC) for the first subband; and determining a channel quality indicator (CQI) and a precoding matrix indicator (PMI) based at least on the MIC.

12. The system of claim 11, wherein the communication device is operable to determine the best-M PMI based on the highest subband MIC and then map the best-M subbands associated with the best-M PMI to the best-M CQI.

13. A method in a wireless communication network, the method comprising:

determining raw measurements including a channel estimation and a noise variance estimation of each of one or more subbands;

calculating, based on a transmission mode, a mean instantaneous capacity (MIC) for each of the one or more subbands, the transmission mode being one of eight or more supported transmission modes; and determining, based at least the transmission mode and the MIC, a channel quality indicator (CQI) for each of the one or more subbands.

14. The method of claim 13, wherein the MIC is calculated in conjunction with one of the MIC calculations including a Single Input Multiple Output (SIMO) MIC calculation and a transmit diversity MIC calculation.

15. The method of claim 13, further comprising limiting the determining of the CQI to subbands associated with a best-M PMI, wherein the best-M PMI is selected based on the highest subband MIC.

16. The system of claim 11, wherein the communication device is further operable to determine the RI independently from feedback modes, the first plurality of measurements including channel estimations and noise variance estimations of subbands including the first subband.

17. The system of claim 11, wherein the communication device is further operable to determine a wideband CQI, a subband CQI, a wideband PMI, and a subband PMI by using subband-based measurements.

18. The system of claim 11, wherein the communication device is further operable to determine, based on a transmission mode, the MIC in conjunction with one of the MIC calculations including a Single Input Multiple Output (SIMO) MIC calculation, a transmit diversity MIC calculation, and a large delay CDD (cyclic delay diversity) MIC calculation.

19. The method of claim 13, further comprising selecting a rank indicator (RI) independent from feedback modes and without requiring a precoding matrix indicator (PMI) search.

20. The method of claim 13, further comprising determining a wideband CQI, a subband CQI, a wideband PMI, and a subband PMI by using subband-based measurements.

* * * * *